United States Patent [19]
Kusiak

[11] 3,766,798
[45] Oct. 23, 1973

[54] BALL-SCREW ACTUATOR WITH STOP MECHANISM
[75] Inventor: Edward H. Kusiak, Longmeadow, Mass.
[73] Assignee: United Aircraft Corporation, East Hartford, Conn.
[22] Filed: Oct. 4, 1972
[21] Appl. No.: 295,045

Related U.S. Application Data
[63] Continuation of Ser. No. 180,960, Sept. 16, 1971, abandoned.

[52] U.S. Cl............................................ 74/424.8 R
[51] Int. Cl............................................... F16h 1/18
[58] Field of Search.................... 74/89.15, 424.8 R

[56] References Cited
UNITED STATES PATENTS
3,200,664  8/1965  Mauric............................ 74/424.8 R
3,269,199  8/1966  Deehan et al............... 74/424.8 R X
3,404,581  10/1968  Kraus............................. 74/424.8 R
3,409,622  11/1968  DeLisse...................... 74/424.8 R X Primary Examiner—Leonard H. Gerin
Attorney—Norman Friedland

[57] ABSTRACT

A ball-screw type of actuator is designed to have a plurality of stops for stopping the screw at a predetermined position wherein a single snubber assembly serves to absorb the torsional energy when the stops are engaged.

7 Claims, 6 Drawing Figures

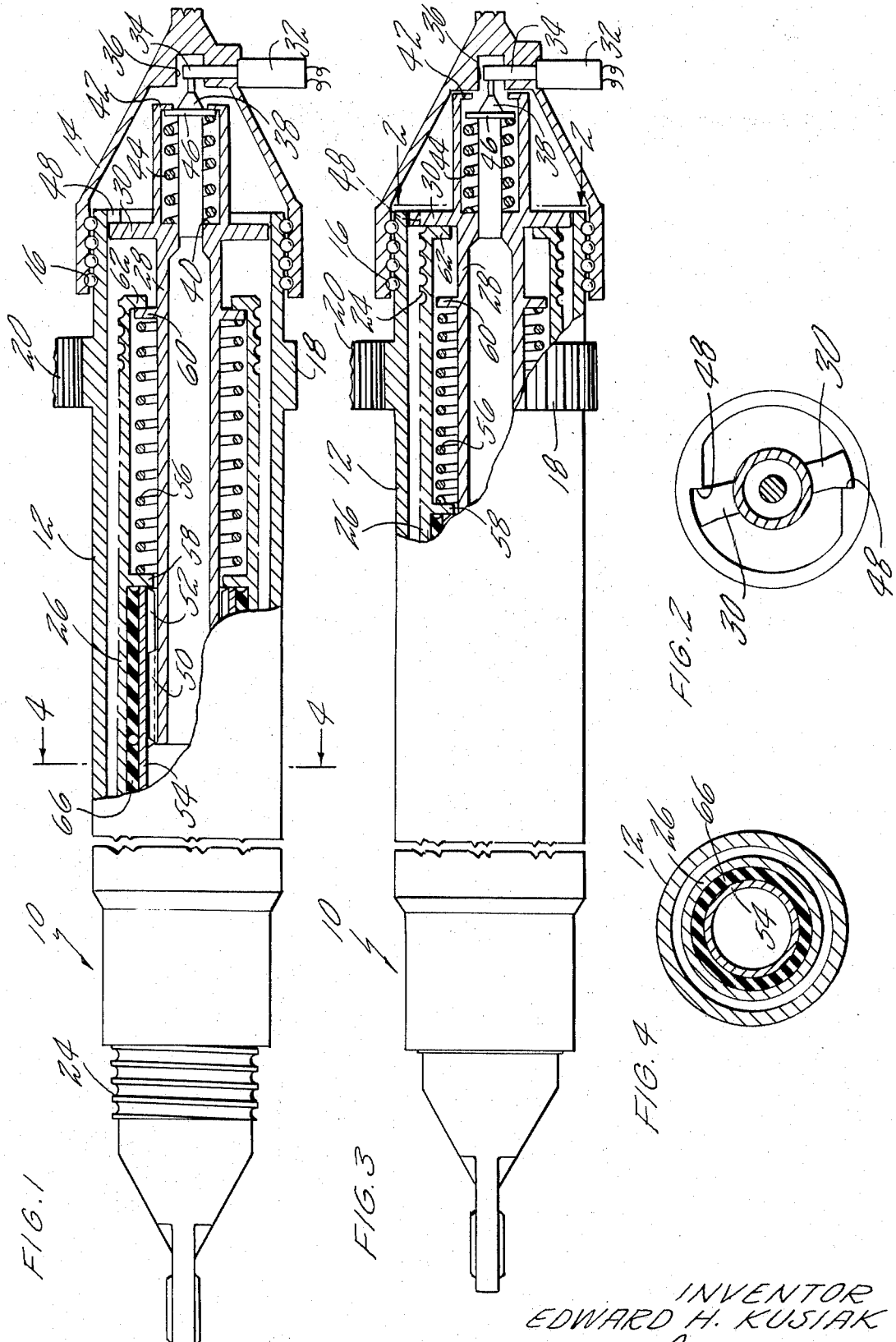

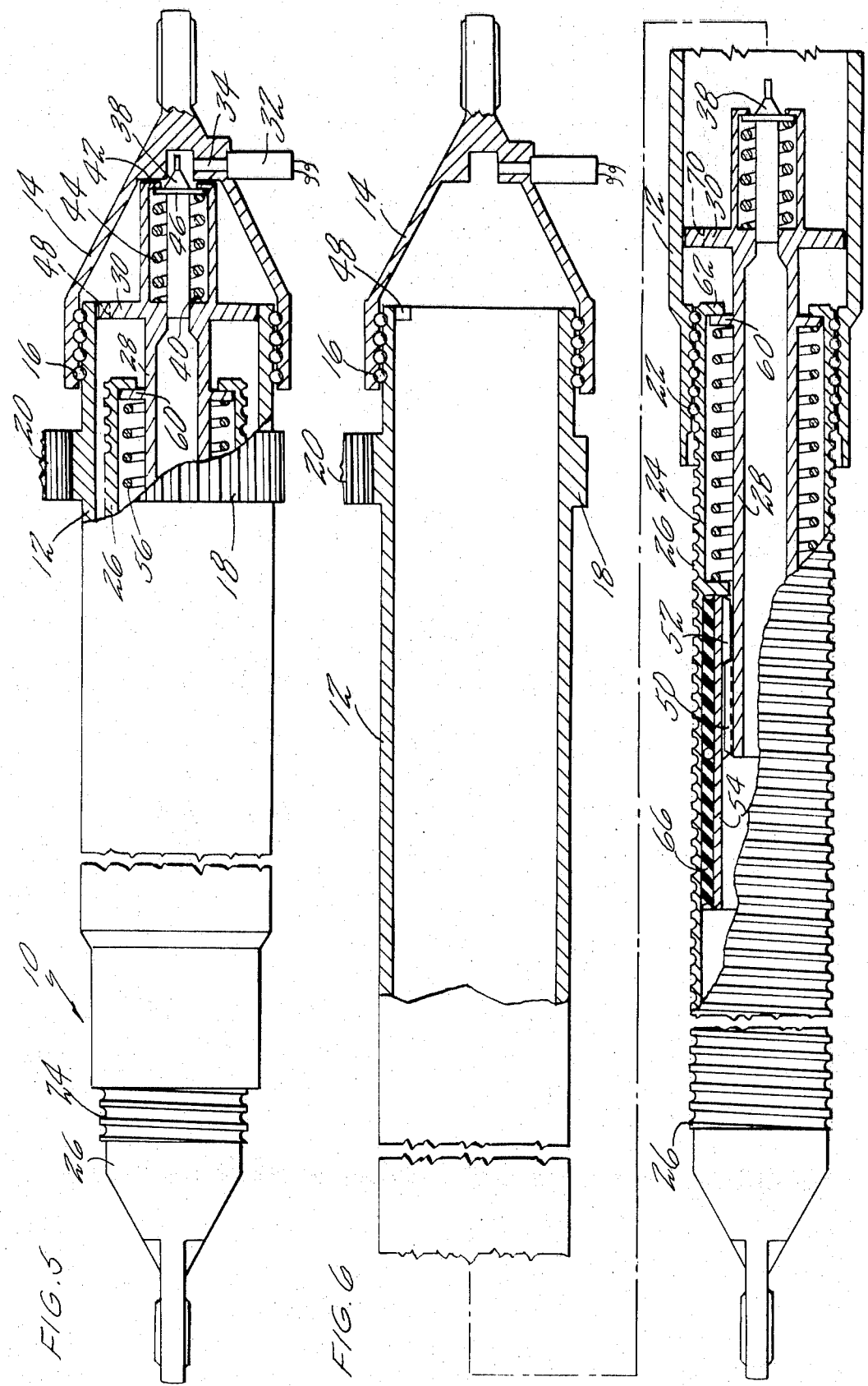

3,766,798

BALL-SCREW ACTUATOR WITH STOP MECHANISM

This is a continuation of application Ser. No. 180,960, filed Sept. 16, 1971, now abandoned.

BACKGROUND OF THE INVENTION

This invention relates to ball-screw actuators and particularly to the type that includes positional stops wherein a single snubber assembly absorbs the energy whenever the stops are engaged.

The problem solved by this invention is the utilization of a single snubber assembly for absorbing the torsional load occasioned by a ball-screw actuator engaging a plurality of stops. In addition a single stop assembly is utilized for at least two retracted positions of the ball-screw.

SUMMARY OF THE INVENTION

The primary object of this invention is to provide in a ball-screw actuator a single snubber assembly for a plurality of stops.

A still further object of this invention is to provide a single stop mechanism for obtaining two different retracted positions of the ball-screw.

A still further object of this invention is to provide in a ball-screw actuator stopping mechanism for positioning the screw in a first retracted position and means for rendering the stop mechanism inoperative for retracting the screw in a still further retracted position.

Other features and advantages will be apparent from the specification and claims and from the accompanying drawings which illustrate an embodiment of the invention.

BRIEF DESCRIPTION OF THE DRAWINGS

FIG. 1 is a view partly in elevation and partly in section illustrating the invention in one position.

FIG. 2 is a fragmentary sectional view taken along the lines 2—2 of FIG. 3.

FIG. 3 is a view partly in elevation and partly in section illustrating the invention in its fully retracted position.

FIG. 4 is a sectional view taken along the lines 4—4 of FIG. 1.

FIG. 5 is a view partly in elevation and partly in section illustrating the invention in another given position.

FIG. 6 is a view partly in elevation and partly in section illustrating the invention in its fully extended position.

DESCRIPTION OF THE PREFERRED EMBODIMENT

In its preferred embodiment this invention is shown as a ball-screw actuator for positioning the wings of an aircraft which necessitates the provisions of stops for limiting the stroke as will be described hereinbelow. It is to be understood, however, that this invention has applicability to other embodiments that will be obvious to one ordinarily skilled in the art. As a wing sweep actuator the control for the actuator would contain means which would arrest the wing motion so that the wing position would never be less than one degree within the stop. Thus, under normal conditions, in this particular embodiment, the stops would not be engaged unless there was a misrigging of the component parts. Therefore, although not limited thereto, the purpose of the stops is to prevent overtravel in the event that the actuator does not properly respond to the control by virtue of misrigging or the like. While the stops are shown in this preferred embodiment for backup purposes, it is to be clearly understood that the invention is not particularly limited thereto and that the particular stops may be utilized in any other ball-screw types of actuators.

Referring next to FIGS. 1–6 which illustrates the details of this invention when the ball-screw actuator generally illustrated by numeral 10 is in the various positions. Actuator 10 comprises an elongated nut-like member 12 journaled in fixed casing 14 and rotatably supported by ball bearings 16. Gear 18 integrally formed with the nut 12 engages gear 20 which serves to rotate the nut in response to a wing sweep actuator control (not shown). Also a no-back clutch of the type disclosed in U.S. Pat. application Ser. No. 58 filed by R. Quenneville issued as U.S. Pat. No. 3,631,951 on Jan. 4, 1972 and assigned to the same assignee may be employed. A series of balls 22 cooperating with rotary nut 12 and the grooves 24 formed in the translatable screw member 26 serves to translate the screw from the fully retracted to the fully extended position as illustrated by FIGS. 3 and 6. Ball-screw actuators are well known in the art and a complete detailed description thereof is omitted herefrom for the sake of clarity and simplicity.

In accordance with this invention as can be seen by FIG. 1 an elongated tubular member hereinafter referred to as snubber shaft 28 is centrally supported in the actuator and is coaxially mounted relative to the screw member 26. Snubber shaft is normally carried with screw 26 and is restrained like the screw member 26. Snubber shaft 28 carries a pair of snubber tangs 30 which serve to provide the stopping means for the rotating nut 12 as will be described hereinbelow. The position illustrated in FIG. 1 is the oversweep disarming position which allows the screw to be retracted to its most retracted position as illustrated in FIG. 3. In this position solenoid 32 is in its actuated position so that plunger 34 is in its most extended position in recess 36 and is adapted to engage the end of plunger 38 which is retained in snubber shaft 28 and fixed between shoulders 40 and flange 42. Spring 44 engages a spring retainer 46 which loads the plunger 38 in the direction illustrated. The solenoid and the mechanism just described serves to prevent the tangs 30 from engaging the stop member 48 which extends downwardly from the inner diameter of rotating nut 12. Thus, continual rotation of the nut in a retracted direction serves to further retract the screw 26 rightwardly until it bears against the end face of tangs 30; this is more clearly illustrated in FIG. 3.

As can be seen from FIG. 1 the snubber shaft 28 carries spline 50 which is splined to the spline 52 formed on the inner diameter of hollow shaft 54 so that each can move axially relative to each other. The spring 56 which is lighter (less force) than spring 44 is disposed between internal shoulder 58 formed integrally with the screw 26 and the upstanding member 60 formed integrally with the snubber shaft 28. Since spring 56 is lighter and offers least resistance to the movement of screw 26 when moved to its further retracted position as shown in FIG. 3 it will compress until the end 62 bears against face of the tangs 30 forcing the tangs to bear against the rotating stop 48. This movement compresses spring 44 to permit the snubber shaft to move into engagement position with stops 48. While in this embodiment, the screw 26 is shown to bear up against tangs 30 it is to be understood that since there may be sliding motion between these two members it may be more desirable to obtain the stop movement force by other means, as for example, having the end of 54 bear up against a shoulder which may be formed on the outer diameter of snubber shaft 28.

In order to absorb the energy of the torsional load imposed by the action between an engagement of the rotating stop 48 and the nonrotating tangs 30, the snubber mechanism is utilized. In the preferred embodiment an elastomer snubber 66 is sandwiched between the tubular shaft 54 and the inner diameter of the screw 26. This is more clearly illustrated in FIG. 4 which is a section taken through lines 4—4 of FIG. 1. The elastomer 66 which may be any low modulus elasticity material, as for example, rubber, is bonded to the outer diameter of shaft 54 and to the inner diameter of the screw 26 thus forming an integral unit. The torsional load is transmitted through the tangs 39 through snubber shaft 28 through the splines 50 and 52 to the elastomer 66. For a more detailed description of the elastomer snubber, reference is hereby made to the U.S. patent application entitled "Torsional Elastomer Snubber" filed by R. Cornell on even date and assigned to the same assignee. However, it is to be understood that this invention is not limited to the particular type of snubber employed but as will be appreciated from the description to follow a single snubber assembly serves to absorb the torsional energy for all of the stop positions. For example, instead of the elastomer snubber as shown herein a well-known metal torque tube or rod may be attached to or made integral with one end of the snubber shaft and extend to the other end of the screw member.

As illustrated in FIG. 2 when solenoid 32 is in the energized position and when the snubber tangs 30 engages the rotating stops 48 which may take the form of shoulders formed on the inner diameter of nut 12, the screw 12 is telescoped in its most retracted position. As can be seen from FIG. 3 the plunger spring 44 is in the compressed position and that plunger 46 is spaced from the flange 42 formed on the snubber shaft 28.

FIGS. 5 and 6 illustrate the ball-screw actuator in the other two positions. FIG. 5 illustrates what is referred to when used as a wing sweep actuator as the flight oversweep stop position which is less than the fully retracted position. In this position solenoid 32 is in the deactuated position so that plunger 34 is in the retracted position. When the screw 26 translates to the retracted position the tangs 30 which are carried with the snubber shaft 28 and movable with the screw 26 engage the rotating stop 48 in the position shown. It is apparent from the foregoing that the tangs 30 are permitted to engage the stop 48 at some distance short of the fully retracted position.

As can be seen in FIG. 6 fully extended stop member 70 similar to the rotating stop member 48 is formed on the inner diameter of rotating nut 12 so that tangs 30 engage stop 70 when in the fully extended position thus providing stop means in the fully extended position. It being noted that whenever tangs 30 of the snubber shaft 28 engages either rotating stop 48 or the rotating stop 70 torsional load is transmitted through the snubber shaft 28 to the elastomer 66 of the snubber for absorbing the torsional energy. Thus, it is apparent that a single snubber assembly is utilized for absorbing the torsional energy for the three stops described hereinabove.

It should be understood that the invention is not limited to the particular embodiments shown and described herein, but that various changes and modifications may be made without departing from the spirit or scope of this novel concept as defined by the following claims.

I claim:

1. A ball-screw actuator having a rotary nut and a nonrotary screw, means for imparting rotational movement to said nut for telescoping said nonrotating screw,
   stop means including an elongated shaft having radially extending tangs formed thereon and adapted to engage an abutment carried by said rotary nut,
   snubber means cooperatively operative with said elongated shaft to absorb the torsional energy transmitted when said tangs engage said abutment,
   means for rendering said stop means inoperative when said screw is in a first retracted stop position, and means for placing said tangs into engagement with said abutment when said screw is in a further retracted second stop position, such that the torsional energy is also absorbed by said snubber.

2. A ball-screw actuator as claimed in claim 1 including another abutment or said screw axially spaced from said abutment carried by said nut adapted to engage said tangs when said screw is in an extended position, said snubber absorbing the torsional load when in said extended position when said tangs engage said other abutment.

3. A ball-screw actuator as claimed in claim 1 including first resilient means holding said elongated shaft in retractable relationship with said screw, and a second resilient means having a greater force than said first resilient means imposing a load on said screw to hold it in one direction, said means for rendering said stop inoperative including a plunger adapted to engage said second resilient means to prevent said tangs from engaging said abutment and permit said screw to be further retracted and engage said tangs until said force of said first resilient means permits said elongated shaft to position axially to overcome the force of said second resilient means so that said tangs engage said abutment.

4. A ball-screw actuator as claimed in claim 3 wherein said first and second resilient means are helically wound coil springs.

5. A ball-screw actuator as claimed in claim 3 including a solenoid actuating said plunger in and out of engagement with said second resilient means.

6. A ball-screw actuator having a casing supporting a rotary nut and a nonrotary screw, means for imparting rotational movement to said nut for telescoping said nonrotating screw,
   stop means including an elongated shaft extending concentrically with and disposed in an opening formed in said nut and having radially extending tangs formed thereon, an abutment carried on the inner diameter of said rotary nut adapted to contact said tangs, snubber means cooperatively operative with said elongated shaft to absorb the torsional energy transmitted when said tangs engage said abutment, means for rendering said stop means inoperative when said screw is in a first retracted stop position, means for placing said tangs into engagement with said abutment when said screw is in a further retracted second stop position, such that the torsional energy is also absorbed by said snubber, said means for rendering said stop means inoperative including a first spring for loading said elongated shaft in one direction, a second spring having a force lighter than said first spring loading said shaft in an opposite direction, a solenoid adapted to place said first spring in the loaded position such that said tangs remain out of engagement when said screw goes beyond the first retracted stop position and overcomes the force of said second spring and overcomes the force of the first spring to allow the tangs to engage said abutment at the second stop position.

7. A ball-screw actuator having a pair of cooperating members being disposed for relative rotation, means for imparting rotational movement to one of said members for telescoping the other of said members which is held in a nonrotating positon, stop means including an elongated shaft having radially extending tangs formed thereon and adapted to engage an abutment carried by said rotating member, snubber means cooperatively operative with said elongated shaft to absorb the torsional energy transmitted when said tangs engage said abutment, means for rendering said stop means inoperative when said nonrotating member is in a first retracted stop position, and means for placing said tangs into engagement with said abutment when said nonrotating member is in a further retracted second stop position, such that the torsional energy is also absorbed by said snubber.

* * * * *